United States Patent
Fields et al.

(10) Patent No.: US 6,704,797 B1
(45) Date of Patent: Mar. 9, 2004

(54) METHOD AND SYSTEM FOR DISTRIBUTING IMAGE-BASED CONTENT ON THE INTERNET

(75) Inventors: Duane Kimbell Fields, Austin, TX (US); Thomas Preston Gregg, Round Rock, TX (US); Sebastian Daniel Hassinger, Blanco, TX (US); William Walter Hurley, II, Round Rock, TX (US); Mark Andrew Kolb, Round Rock, TX (US); Stacy Braden Vu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,453

(22) Filed: Jun. 10, 1999

(51) Int. Cl.[7] .............................. G06F 15/16; G09G 5/00
(52) U.S. Cl. ........................ 709/246; 709/229; 345/619
(58) Field of Search .................... 709/217, 228, 709/229, 203, 218, 246; 707/530; 380/54; 345/619, 626, 690, 744, 745, 760; 713/168, 170, 176

(56) References Cited

U.S. PATENT DOCUMENTS

| | | | |
|---|---|---|---|
| 5,050,230 A | | 9/1991 | Jones et al. |
| 5,448,727 A | | 9/1995 | Annevelink |
| 5,504,879 A | | 4/1996 | Eisenberg et al. |
| 5,699,458 A | | 12/1997 | Sprague |
| 5,715,403 A | * | 2/1998 | Stefik ........................... 705/44 |
| 5,784,461 A | | 7/1998 | Shaffer et al. |
| 5,870,562 A | | 2/1999 | Butman et al. |
| 5,944,790 A | * | 8/1999 | Levy ........................... 709/218 |
| 6,006,231 A | * | 12/1999 | Popa ........................... 707/101 |
| 6,049,821 A | * | 4/2000 | Theriault et al. ........... 709/203 |
| 6,112,192 A | * | 8/2000 | Capek .......................... 705/59 |
| 6,167,441 A | * | 12/2000 | Himmel ....................... 709/217 |
| 6,282,650 B1 | * | 8/2001 | Davis .......................... 713/176 |
| 6,412,008 B1 | * | 6/2002 | Fields et al. ................. 709/228 |
| 6,418,439 B1 | * | 7/2002 | Papierniak et al. ............ 707/9 |

FOREIGN PATENT DOCUMENTS

WO    WO 200201836 A2 *   1/2002   .......... H04M/00/00

OTHER PUBLICATIONS

Voyatzis, G. et al., "Embedding robust watermarks by chaotic mixing", IEEE International Conference on Digital Signal Processing Proceedings, ISBN: 0–7803–4137–6, vol. 1, pp. 213–216, Jul. 1997.*

Swanson, M.D. et al., "Multimedia data–embedding and watermarking technologies", Proceedings of IEEE, vol. 86, issue 6, pp. 1064–1087, Jun. 1998.*

Collberg, C. et al., "Software watermarking: models and dynamic embeddings", ACM SIGPLAN–SIGACT symposium on Principles of Programming Languages, ISBN: 1–58113–095–3, pp. 311–324, Jan. 1999.*

* cited by examiner

*Primary Examiner*—Jason D. Cardone
(74) *Attorney, Agent, or Firm*—Duke W. Yee; Jeffrey S. LaBaw; Patrick C. R. Holmes

(57) ABSTRACT

The present invention protects images via a server-based policy that results in the selective distribution of one of multiple versions of an original image. The policy includes a set of one or more rules that each include given criteria. When a request for a web page is received, a given rule in the set is evaluated against client-specific data (e.g., such as client IP address, the identity of the referring page, or the like) obtained from the client request. If a condition of the rule is satisfied against the client-specific data, a given restriction is imposed on the image distribution.

3 Claims, 3 Drawing Sheets

METHOD AND SYSTEM FOR DISTRIBUTING IMAGE-BASED CONTENT ON THE INTERNET

BACKGROUND OF THE INVENTION

1. Technical Field

The present invention relates generally to distributing image content over a computer network. More specifically, the invention relates to protecting images via a policy-based set of credentials that results in the distribution of one of multiple versions of an image.

2. Description of the Related Art

The World Wide Web is the Internet's multimedia information retrieval system. In the web environment, client machines effect transactions to web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives in return a document or other object formatted according to HTML. A collection of documents supported on a web server is sometimes referred to as a web site.

One of the technical advantages of the World Wide Web is the ease with which digital content (e.g., images, graphics, sound, video, movies and the like) may be transmitted and distributed to many users. Indeed, copying a digital file is as easy as clicking on a computer mouse. Copyright laws afford a copyright owner the exclusive right to reproduce the copyrighted work in copies, to distribute such copies, and to publicly perform and display the work. Each time a digital file is transferred over the Internet and copied into memory of a user's computer, the copyright owner's exclusive reproduction right is implicated. Indeed, in an open system (e.g., a personal computer accessing the World Wide Web through an Internet Service Provider (ISP)), copies of copyrighted materials can undergo unlimited further copying and transmission without the ability of the owner to collect appropriate compensation. In addition, a site need not even host given content to cause infringement if it includes links to such content.

Many content providers naturally are hesitant to make their copyrighted works available over the Internet due to the ease with which these materials may be copied and widely disseminated without adequate compensation. Presently, Internet commerce remains highly unregulated, and there is no central authority for managing collection and allocation of content provider royalties. Moreover, while publishers and content rights societies and organizations are attempting to address the legal and logistical issues, the art has yet to develop viable technical solutions.

Protection of image content is of special concern to content providers. The growth of electronic commerce in particular has been fueled in large part by the widespread availability of image content on the web. While copyright provides significant protection for images, techniques for protecting images from wrongful copying and reuse have not kept pace. In this regard, it is known in the prior art to limit access to certain image content on an all or nothing basis. Thus, for example, access control technology, such as ACLs, are used to restrict certain content to certain authorized users. Such techniques either provide access to the images or they do not. Another approach to distribution of image content is described in U.S. Pat. No. 5,760,917 to Sheridan. This patent discloses a distributed system that controls access to images stored at a central hub. A content provider defines a set of access rights (e.g., view, print, copy) for given third parties that are permitted access to the images. The third party is then notified of his or her access rights. That notification may include a low resolution version of all or some of the images. In another technique, as described in U.S. Pat. No. 5,784,461, an encryption technique is used to secure high resolution images stored at an image fulfillment center. A permitted user is sent a low resolution image, together with information that enables the user to decrypt and access the high resolution image. A similar technique is described in U.S. Pat. No. 5,699,458, wherein images are encoded and users may only be allowed access to a low resolution image (i.e. a thumbnail) or the entire image, depending on the encoding scheme used.

While such techniques do provide secure and limited access to different image versions, they typically require complex and costly protection schemes. Moreover, these techniques often require specialized software at the client, which is undesirable.

There remains a need to provide an image distribution technique for the Internet that is lightweight, that uses existing protocols, and that is completely transparent to the end user. This invention solves this important problem.

BRIEF SUMMARY OF THE INVENTION

The present invention protects images via a server-based policy that results in the selective distribution of one of multiple versions of an original image. The policy includes a set of one or more rules that each include given criteria. When a request for a web page is received, a given rule in the set is evaluated against client-specific data (e.g., such as the identity of the referring page) obtained from the client request. If a condition of the rule is satisfied against the client-specific data, a given restriction may be imposed on the image distribution.

Thus, the rules in the policy determine which version, if any, is served in a given page. Thus, for example, a given policy may include a rule that a given image is not distributed from the server to any referring pages outside of a given domain. Another rule may restrict distribution to a modified version of an image, e.g., a version that is overlaid with a company logo or watermark, to any client machine that is not on a permitted list of IP addresses. Yet another rule may restrict distribution to a low resolution version of the image to any referring page that is within a given third party domain. Of course, the above examples are merely exemplary.

Thus, with the policy-based implementation of the present invention, the web server administrator may develop an access policy comprising a set of one or more rules that limit how an image is distributed from the server in response to client-specific data included in server requests received from web clients in the network. The respective access policy may be based on given client-specific access criteria, e.g., the identity of the referring page, the client machine IP address, an ISP identity, a user identifier such as a cookie, the existence of a user authentication, or the like, however, the client-specific access restriction need not be exposed to the requesting clients.

In accordance with an embodiment of the invention, a method of restricting access to an image begins by establishing a distribution policy at a server. The policy defines at least one rule that defines criteria for permitted distribution of the image. In response to receipt of a request for the image (or for a page that includes the image), the method parses the request to identify specific data pertaining to the requesting client. This data is then compared to the distribution criteria in the rule. A given version of the image is then served as a result of the comparison. The version may have been stored at the server or it may generated "on-the-fly" as the page is served to the requesting client.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
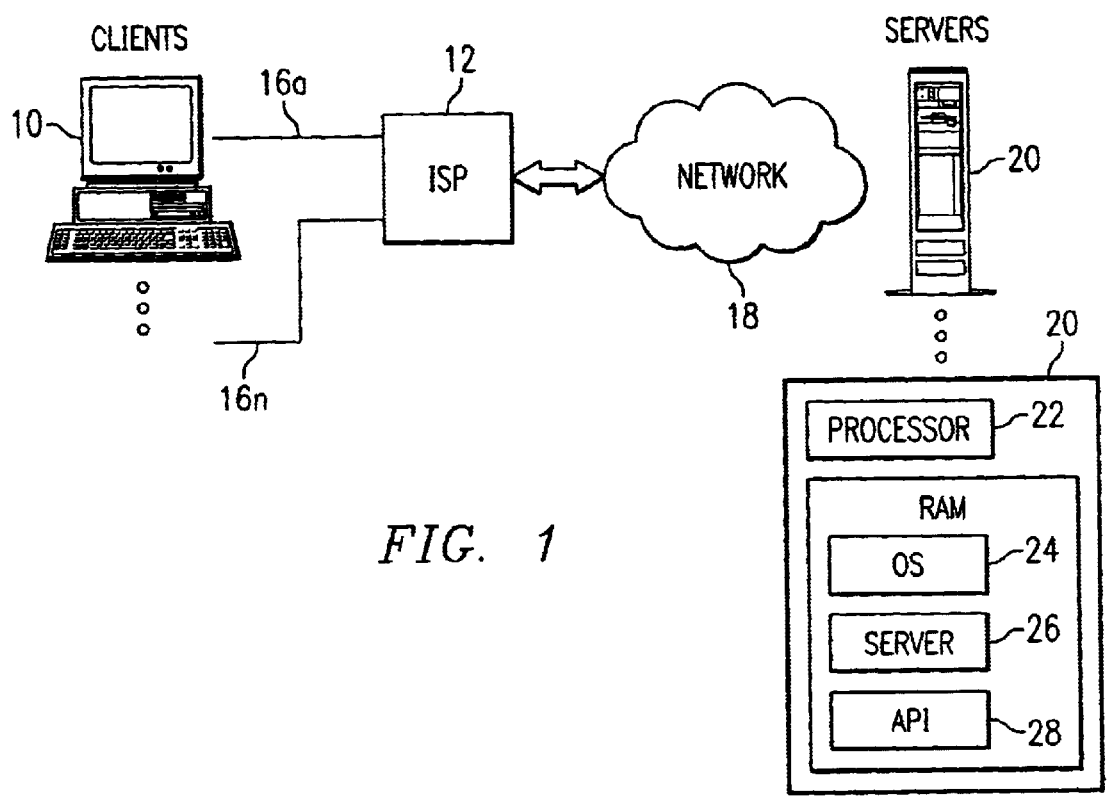
FIG. 1 is a simplified illustration of a client-server environment in which the present invention may be implemented.

A representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a–16n. ISP 12 interfaces the client machines 10 to the remainder of the network 18, which includes a plurality of web content server machines 20. Network 18 typically includes other servers for control of domain name resolution, routing and other control functions. A client machine typically includes a suite of known Internet tools, including a Web browser, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

A representative web server 20 is an IBM Netfinity server comprising a RISC-based processor 22, the AIXQ operating system 24 and a web server program 26. The server 20 may include an application programming interface (API) 28 that provides extensions to enable application developers to extend and/or customize the core functionality thereof through software programs including plug-ins, servlets, and the like.

One such program is an image distribution mechanism according to the present invention. Generally, the mechanism enables a server administrator to create a distribution policy for a given image. The policy includes a set of one or more rules. A given rule typically defines a criteria that evaluates to a given true or false condition. Thus, if the criteria for a rule is met, a given action is taken or not taken, as the case may be, as defined by the rule. According to the present invention, the criteria for a given rule is dependent on client-specific data associated with a given client request to the server. Thus, for example, representative client-specific data include: an identity of a referring page (i.e. the page from which the link to the server was selected), a client machine IP address, the identity of a third party service provider (e.g., an ISP) that provides Internet service to the client, the existence (or lack thereof) of a user authentication, a user identifier such as a cookie, or other such data. Of course, the above examples of client-specific data are merely exemplary.

In a preferred embodiment, a set of image versions are stored at the server. A given image version may then be associated with given client-specific data. When a given client request for the image (or for a page that includes the image) is received at the server, the image version whose associated distribution criteria matches (or, alternatively, best matches) the client-specific data is then served. In an alternate embodiment, a given image version (e.g., a low resolution copy of the original image) is generated "on-the-fly" in response to receipt of the client request.

In the preferred embodiment, the image version is served as a function of where the user (i.e. the client browser) last visited before accessing the image. By way of brief background, when a user clicks on a hyperlink, a request is sent to the server on which the linked document is stored requesting the contents of the referenced document. This request takes the form of a command (usually GET or POST) and a set of headers that provide additional information for processing the command. One of the headers that is sent when a link is followed is the "Referer" header, which specifies the URL of the document from which the link was followed. For example, if the user is reading a document with a URL of http://www.cross-site.com/home and follows a link that takes him to the URL http://www.cross-site.com/support, the request for this support page will include a "Referer" header that specifies http://www.cross-site.com/home as the referring document. In an HTML document, images to be displayed are specified using an <IMG> tag that specifies the URL of the image to be displayed. When a browser loads a page with <IMG> tags in it, these URLs are accessed to load the corresponding image, and in this case, the HTTP request for the image specifies the HTML document as its referrer, using the same "Referer" header mechanism described above.

In this way, a server that implements the image protection scheme described herein examines these "Referer" headers whenever an image request is received. It determines if the request comes from a local server, or from somewhere else, and takes the appropriate action.

Figure 2:
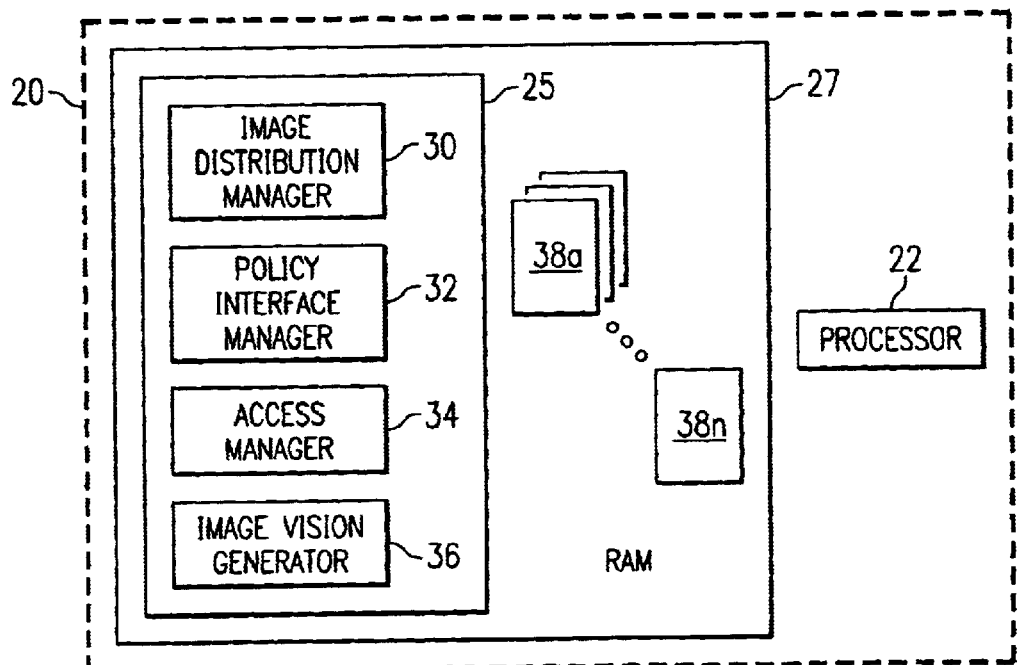
FIG. 2 is a block diagram of the various functional components of the image distribution mechanism of the present invention.

Referring now to FIG. 2, the image distribution mechanism may be implemented most conveniently in software, namely, as a set of instructions that are executed in a processor. A particularly preferred implementation is as a Java servlet. Alternatively, the mechanism may be implemented in native code. Thus, for purposes of illustration, FIG. 2 shows the mechanism 25 as being resident in system memory (e.g., RAM) 27 associated with a given processor 22 operating within the server platform 20. The mechanism 25 includes several functional components: an image distribution manager 30, a policy interface manager 32, an access manager 34, and an image version generator 36. The image distribution manager 30 is the high level control routine. When the inventive functionality is accessed (e.g., via a menu on a server GUI), the image distribution manager calls the policy interface manager 32. The policy interface manager 32 provides a convenient user interface by which a server administrator or other may generate an access policy for a given image or image type. As will be seen below, the policy interface manager 32 presents a series of display panels or screens by which the user can define the access policy. The access manager 34 is a routine that controls the actual distribution of the image version. The access manager compares client-specific data associated with a given client request to the rules criteria of a given policy and selects the image version to serve. The image version generator 36 is used to create the plurality of image versions that are required. The generator may operate as the web page including the modified image is being served. As illustrated in FIG. 2, the different versions 38a–38n are also supported in system memory or some other storage (e.g., hard disk, optical disk, flash memory, or the like).

Figure 3:
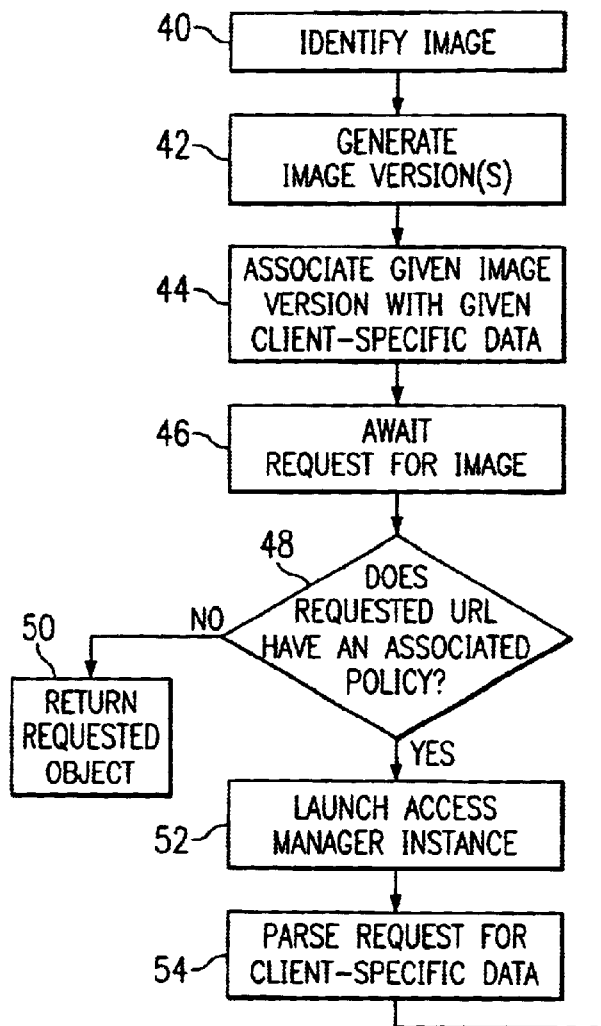
FIG. 3 is a flowchart illustrating the basic operating principles of the present invention.
Figure 3:
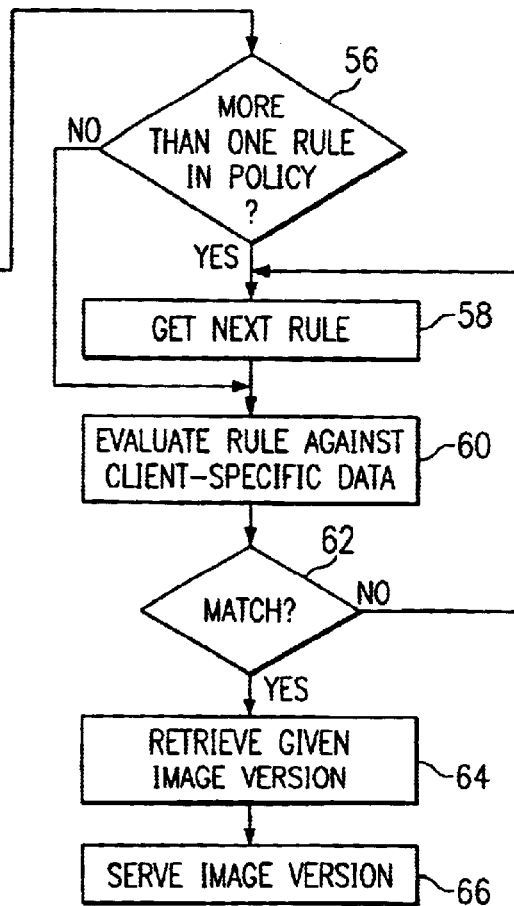

FIG. 3 is a flowchart illustrating the basic operation of the mechanism of the present invention. The routine begins at step 40 by identifying a given image that is to have an associated distribution policy. Typically, the image is located at a specified URL at the web server. At step 42, the administrator generates a set of one or more image versions. An interface for use in this process is described below and illustrated in FIG. 4. Thus, for example, an original image may have a plurality of different versions, e.g., a low resolution version, a greyscale version, a version having a watermark associated therewith, a version consisting of only a portion of the original image, an outdated version of the image, a version having a given legend, such as a copyright or trademark, associated therewith, or the like. Of course, the above examples are merely illustrative. At step 44, the administrator associates a given image version with given client-specific data. This process is accomplished using the interface described below and illustrated in FIG. 5. Thus, for example, a given image version may be associated with any requests for the original image that originate from a referring page outside of the server domain. As another example, the given image version may be associated with any requests that originate from a given IP address, a given user group, or the like. Of course, a first version of an original image may be associated with first client-specific data while a second version of the same original image may be associated with second client-specific data. Thus, steps 42 and 44 enable the administrator to establish a distribution policy for that image that defines at least one rule including criteria (namely, the client-specific data) for permitted distribution of the image.

The routine then continues at step 46 with the image distribution manager awaiting receipt of a request for the image. Typically, the request for the image is received in the form of a request for a web page that includes the image, although this is not a requirement of the invention. In some cases, e.g., where the base web page is located elsewhere, the request may be specifically directed to the image URL. When a request for the image is received, the image distribution manager determines whether the requested URL has an associated distribution policy. This is step 48. If not, the routine branches to step 50 and returns the requested object. If, however, the outcome of the test at step 48 is positive, the image distribution manager launches an instance of the access manager. This is step 52. At step 54, the access manager parses the request for given client-specific data. At step 56, the access manager performs a test to determine whether the policy has more than one rule. If so, then the routine gets the next rule at step 58. At step 60, the rule is evaluated against the client-specific data. Step 60 is also reached by a negative outcome to step 56. At step 62, a test is performed to determine if there is a match. If not, the routine returns to step 58 to fetch the next rule. If there is a match between the client-specific data and the distribution rule, the routine continues at step 64 to retrieve a given image version. This image version is then served (alone or within a web page) at step 66 to complete the processing.

Figure 4:
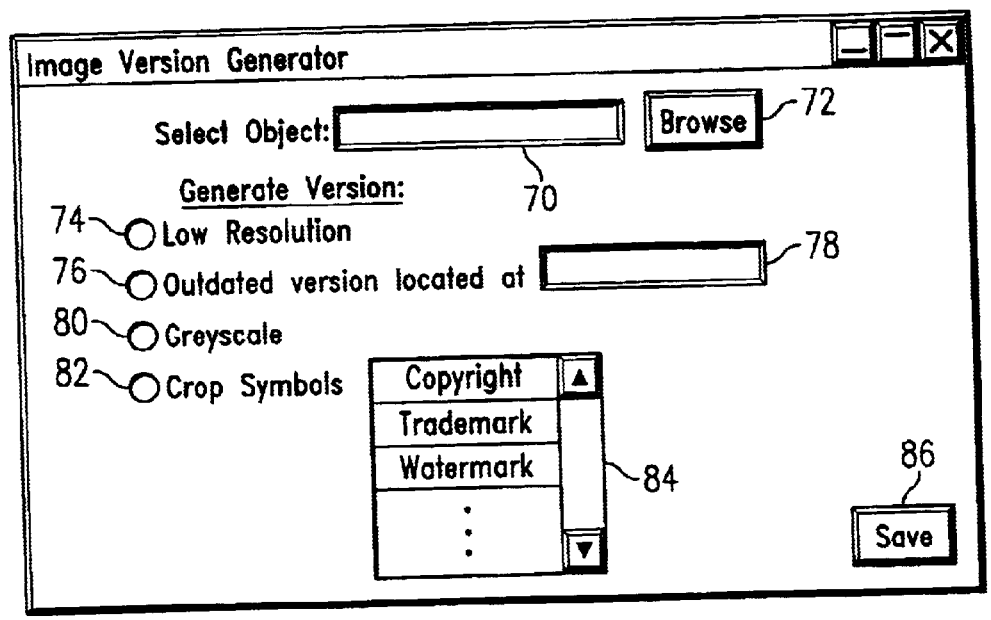
FIG. 4 illustrates a representative interface for generating a plurality of versions of a given image according to the present invention.

FIG. 4 illustrates a representative user interface that is useful in generating a set of one or more image versions. The interface includes a number of conventional display controls. A URL field 70 is included for entry of a given image object. The user may also select a Browse button 72 to search for a given image object for local storage. Underlying the URL field 70 is a set of controls for defining a set of image versions. Thus, for example, if the user selects the radio button 74, a low resolution image version is generated. A low resolution image version itself may be of different grades. Thus, the version may simply include a lesser amount of colors, a lesser number of pixels, or the like. A particularly poor resolution of the image may be served if it is desired to incite the user to access the server from a particular domain.

If the user selects radio button 76, an outdated version of the image, located at a URL entered in field 78, is selected. Instead of entering information in the field, the routine, alternatively, may simply retrieve a cached version of the image with a given outdated timestamp. Any other convenient retrieval mechanism may be used to obtain the outdated image version. Selection of radio button 80 generates a greyscale version of the image. Selection of radio button 82 allows the user to crop the image, e.g., by pulling up a separate display panel from which the user may select a given portion of the image (as the desired version). Versions that include symbol overlays (e.g., a trademark, a copyright symbol, a watermark) may be generated using the listbox 84. When the user is done generating the image version(s), he or she selects the Save button 86. Each of the image versions is then saved.

Figure 5:
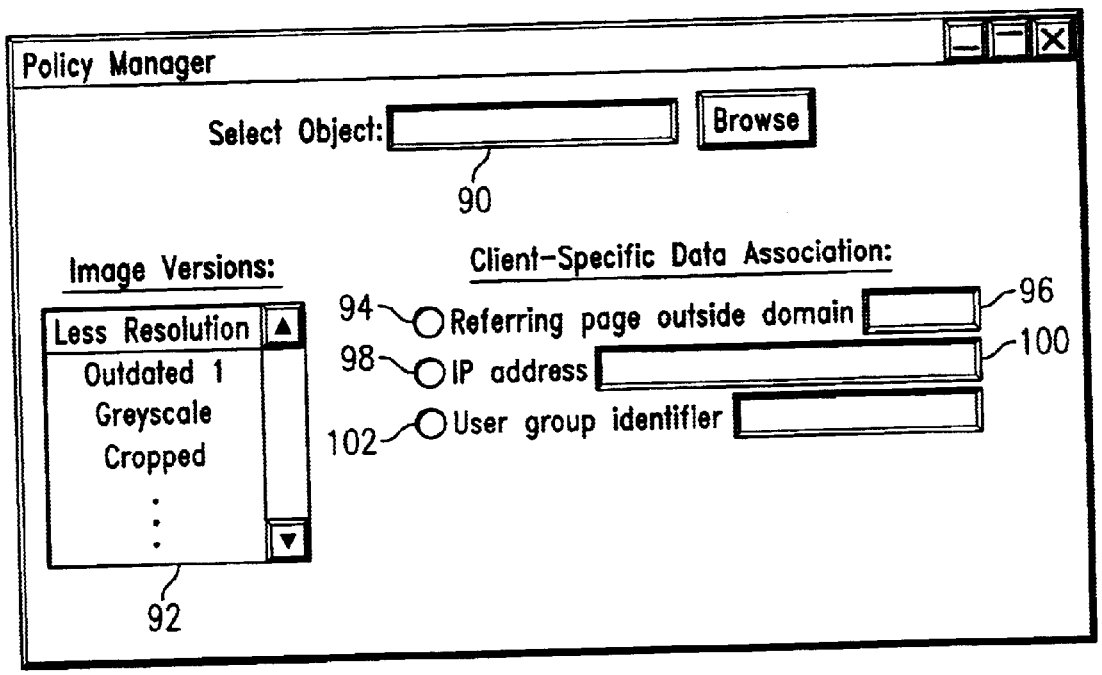
FIG. 5 illustrates a representative interface for the image distribution mechanism through which a server administrator sets a distribution policy for a given image.

FIG. 5 illustrates a representative policy manager interface. When the user enters the URL of a given image into the field 90, the listbox 92 is automatically populated with the image versions. By selecting a given image version, the user may then associate the selected version with given client-specific data. In this example, the user has selected the low resolution version of the image. With this selection, he or she may then associate this version with the client-specific data. To this end, the user is given the choice of selecting given data. Selection of radio button 94 associates this low resolution image version with any referring page that is not within the domain identified in the field 96. An alternative is to merely associate the full resolution image with a given referring page. Selection of radio button 98 allows the administrator to associate this version with a given IP address that is entered in field 100. Selection of radio button 102 enables the administrator to associate this version with a given user group identifier. Of course, these examples are merely illustrative.

If desired, a more simplified user interface may be used. Thus, for example, the interface may simply identify a given image (by URL) and include just a low resolution selection (or the like) that causes the low resolution image to be served unless the client request originates from an identified domain. It may also be desired to automate the setup procedure. Thus, for example, the user may select an option (not illustrated) that applies the given policy selection to all images on a page or within a given domain.

Thus, according to the present invention, the administrator may set up various restrictions, such as: limiting distribution of images to any referring pages outside the domain, distributing only a "teaser image" to any referring pages outside of the domain, distributing only a section of the original image to any referring pages outside of the domain, distributing only a section of the original image to any referring pages outside of the domain, or distributing a modified version of the image, overlaid with a company logo, watermark, trademark, or the like) to any referring page outside of the domain. As illustrated above, these restrictions are based on a simply policy mechanism built into the administrative portion of the server. Using the interfaces, the user can customize the policy to affect single images or single referrers, for instance: "if the referring page is outside of this domain and in the domain cai.com, and if the image is the company logo, replace the image in the transfer with an alternative version of the logo." Similar types of complex policy rules may be associated with a given image version by modifying the user interfaces in a well-known manner.

The present invention provides significant advantages. It protects images via a policy-based set of credentials that results in the distribution of one of multiple versions of the original image. It is also lightweight, uses existing protocols, and is completely transparent to the end user. Moreover, the invention solves the problems surrounding licensing and distribution of image content as it allows the server administrator to selectively control how a given image is served and to whom it is served. It also allows the administrator the advantage of allowing for policy-based distribution that can be customized as needed. This customization may be fine enough so as to govern individual images, sections of images, outdated versions of images, or the like.

The present invention is useful in many applications. With respect to a scene from a movie about to be released, a movie studio could place the image on one of their web servers. Web pages written by the studio to promote the movie would display the image in its original form. Business partners (e.g., producers, distributors) could likewise reference the image on the studio's server and display it on their web pages without modification. Reviewers might be able to reference the image, as well, but have a copyright notice automatically superimposed along the bottom. Fan sites that reference the image URL might have the studio's URL superimposed over the image, as well as the copyright notice. Pages at a competing studio's web site might be blocked altogether by responding to such requests with an empty or blacked-out image.

Similarly, a web site that produces graphics displaying stock market performance might deliver up-to-date images when referenced from its own web pages, but deliver delayed images (i.e., a version of the same graphic, but based on less recent data) for any other request. In another example, browsers are rewarded (i.e. with full resolution images) only if they navigate to a page in a certain way (e.g., through a home page of the site). In another example, a user within an intranet receives full resolution images while one who accesses the page via the public Internet receives low resolution images. In an alternative embodiment, the server provides the alternate image version if it detects that the client browser is blocking a referral. Of course, these examples are merely representative.

As noted above, the inventive mechanism is preferably implemented within a server. Thus, the invention does not require any modifications to conventional client machine hardware or software. A representative client is a personal computer, notebook computer, Internet appliance or pervasive computing device (e.g., a PDA or palm computer) that is x86-, PowerPC®- or RISC-based. The client includes an operating system such as IBM® OS/2®, Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications.

As noted above, the above-described functionality is preferably implemented as a Java servlet or as standalone code. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM drive) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by letters patent is set forth in the following claims.

What is claimed is:

1. A method for restricting access to an image served by an image server, comprising the steps of:

establishing a distribution policy that defines at least one rule including criteria for permitted distribution of the image, wherein the distribution policy is established for an access manager associated with the image server;

generating an altered version of the image;

responsive to receipt of a request from a client for the image, parsing the request to identify client-specific data;

comparing the client-specific data against the criteria in the rule and determining whether the request originates from a given referring location wherein the given referring location is a given domain, wherein the comparing and determining steps are performed by the access manager;

serving a given version of the image as a result of the comparison and determination, when the request originates from the given referring location, wherein the serving step is performed by the image server;

serving the altered version of the image as a result of the comparison and determination, when the request does not originate from the given referring location, wherein the serving step is performed by the image server.

2. A server comprising:

a processor;

a storage for storing a plurality of versions of the image at the server; and an image policy distribution application, comprising;

means for establishing a distribution policy that defines a rule including criteria for permitted distribution of the image, wherein the distribution policy is established for an access manager associated with the image server;

means responsive to receipt of a request from a client for a web page that includes the image for parsing the request to identify client-specific data;

means for comparing the client-specific data against the criteria in the rule and determining whether the client request originates from a given referring location, wherein the given referring location is a given domain, wherein the means for comparing and determining are implemented by the access manager;

means for serving the web page together with a given version of the image whose associated distribution criteria best matches the client-specific data, when the client request originates from the given referring location, wherein the means for serving is implemented at the server;

means for serving the web page together with an altered version of the image whose associated distribution criteria best matches the client-specific data, when the client request does not originate from the given referring location, wherein the means for serving is implemented at the server.

3. A computer program product in a computer-readable medium for restricting access to an image served from an image server, comprising:

means for establishing a distribution policy that defines at least one rule including criteria for permitted distribution of the image, wherein the distribution policy is established for an access manager associated with the image server;

means responsive to recent of a request from a client for the image for parsing the request to identify client-specific data;

means for comparing the client-specific data against the criteria in the rule and determining whether the client request originates from a given referring location, wherein the given referring location is a given domain, wherein the means for comparing and determining are implemented by the access manager;

means for serving a given version of the image as a result of the comparison and determination, when the request originates from the given referring location, wherein the serving step is performed by the image server;

means for serving an altered version of the image as a result of the comparison and determination, when the request does not originate from the given referring location, wherein the serving step is performed by the image server.

* * * * *